(No Model.)
J. S. BROOKS
PROTECTOR FOR TREES.
No. 426,106.  Patented Apr. 22, 1890.
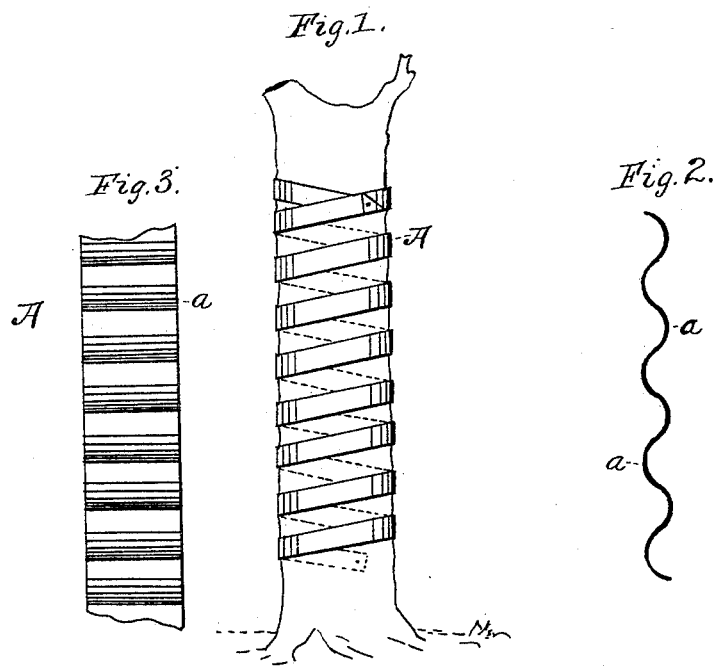
Witnesses.
Thomas Littlejohn
Wm. M. Cliff
Inventor.
John S. Brooks.
by C. R. Ferguson
his attorney.

UNITED STATES PATENT OFFICE.

JOHN S. BROOKS, OF BROOKLYN, NEW YORK, ASSIGNOR OF ONE-HALF TO CALVIN VOORHIS, OF CRAWFORD, NEW JERSEY.

PROTECTOR FOR TREES.

SPECIFICATION forming part of Letters Patent No. 426,106, dated April 22, 1890.

Application filed April 27, 1889. Serial No. 308,321. (No model.)

*To all whom it may concern:*

Be it known that I, JOHN S. BROOKS, a resident of Brooklyn, in the county of Kings and State of New York, have invented a certain new and useful Improvement in Protectors for Trees, of which the following is a specification.

The invention consists in a metal band or strip having transverse corrugations and having a loop formed at one end through which the body portion may pass, the said strip being wound spirally around a tree and fastened thereto.

In the drawings, Figure 1 shows a portion of a tree with the protector thereon. Fig. 2 is an edge view showing plainly the corrugations, and Fig. 3 is a front view.

Referring by letter to the drawings, A designates the protector, consisting of a strip or ribbon of metal, preferably iron. This strip may be of any desired width. I prefer, however, that the width should not exceed two inches. The strip is sinuous, or, in other words, is provided throughout its length with corrugations *a*, which are transverse to the length of the strip. These corrugations allow the protector to expand in accordance with the growth of a tree to which it may be attached.

It is obvious that the corrugations *a* need not be as closely arranged as shown in the drawings. In fact, the corrugations may be placed at an angle or lengthwise of the strip without departing from the spirit of my invention.

As shown in Fig. 1, the protector is designed to be wound spirally around a tree. It may be secured at its ends to the tree in any desired manner.

It is obvious that the strip of sinuous material may be made in any desired lengths, from which may be cut the required length for a tree. I turn one end of the strip to form a loop, through which the main body of the strip may be passed to draw the upper end closely around the tree, and, if desired, a nail may be passed transversely through this loop portion and main body into the tree. The lower end may be secured by a nail.

Having described my invention, what I claim is—

1. A tree-protector consisting of an expansible band formed of metal bent into sinuous folds or convolutions, and adapted to be wound spirally about a tree and fastened to the trunk thereof, substantially as specified.

2. A tree-protector consisting of a corrugated metal band adapted to be wound spirally around a tree-trunk, and having a loop or fold at one end through which the main portion of the band may pass to secure it to a tree, substantially as specified.

JOHN S. BROOKS.

Witnesses:
C. R. FERGUSON,
SAMUEL S. ULTER.

It is hereby certified that the residence of the assignee in Letters Patent No. 426,106, granted April 22, 1890, upon the application of John S. Brooks, of Brooklyn, New York, for an improvement in "Protectors for Trees," was erroneously written and printed "Crawford, New Jersey;" that said residence should have been written and printed *Cranford, New Jersey;* and that the said Letters Patent should be read with this correction therein that the same may conform to the record of the case in the Patent Office.

Signed, countersigned, and sealed this 13th day of May, A. D. 1890.

[SEAL.]

CYRUS BUSSEY,
*Assistant Secretary of the Interior.*

Countersigned:

C. E. MITCHELL,
*Commissioner of Patents.*